United States Patent [19]

Chaney

[11] Patent Number: 4,996,416
[45] Date of Patent: Feb. 26, 1991

[54] OPTICAL DETECTION SYSTEM WITH MEANS FOR EQUALIZING AMBIENT LIGHT LEVELS AT MULTIPLE DETECTORS

[75] Inventor: Raymond J. Chaney, Berkeley, United Kingdom

[73] Assignee: Renishaw plc, United Kingdom

[21] Appl. No.: 340,420

[22] PCT Filed: Jul. 29, 1988

[86] PCT No.: PCT/GB88/00628
§ 371 Date: Mar. 24, 1989
§ 102(e) Date: Mar. 24, 1989

[87] PCT Pub. No.: WO89/01612
PCT Pub. Date: Feb. 23, 1989

[30] Foreign Application Priority Data

Aug. 7, 1987 [GB] United Kingdom ............... 8718803

[51] Int. Cl.$^5$ .......................................... G01J 9/02
[52] U.S. Cl. ................................. 250/225; 356/364; 250/239
[58] Field of Search ................. 250/225, 227, 227.17, 250/239; 356/364, 370, 351

[56] References Cited

U.S. PATENT DOCUMENTS

| | | | |
|---|---|---|---|
| 3,612,689 | 10/1971 | Liskowitz | 356/364 |
| 3,771,875 | 11/1973 | Russo | 356/351 |
| 3,824,018 | 7/1974 | Crane, Jr. | 356/352 |
| 3,871,771 | 6/1973 | Scott | 356/364 |
| 4,170,416 | 10/1979 | Fencil | 356/346 |
| 4,309,108 | 1/1982 | Siebert | 356/352 |
| 4,360,271 | 11/1982 | Downs et al. | 356/351 |
| 4,515,478 | 5/1985 | Ballard et al. | 356/345 |
| 4,594,002 | 6/1986 | McNally | 356/346 |

Primary Examiner—Edward P. Westin
Assistant Examiner—George C. Beck
Attorney, Agent, or Firm—Oliff & Berridge

[57] ABSTRACT

In an optical detection system a plurality of photodiode detectors are placed in an enclosure. The enclosure has an aperature through which is directed a light beam to be analyzed. To eliminate the effect which ambient light entering the aperture would have on the detector signals, each of the detectors are arranged to be at equal distances from the aperture so that they all have the same acceptance cone angle for the light entering the aperture. Thus the ratio of signal to ambient light in the portion of the light beam reaching each detector is the same and the d.c. component of the signal produced by the detector can be easily removed in the signal conditioning electronics. The equal spacing of the detectors from the aperture is achieved in accordance with the invention by using beam splitters in the path of the beam to deflect portions of the beam to detectors which are offset from the base axis.

8 Claims, 1 Drawing Sheet

OPTICAL DETECTION SYSTEM WITH MEANS FOR EQUALIZING AMBIENT LIGHT LEVELS AT MULTIPLE DETECTORS

BACKGROUND OF THE INVENTION

The present invention relates to an optical detection system for providing information from a light beam, for use with optical systems, for example, laser interferometers.

In such optical detection systems an array of photo-detectors, usually photo-diode detectors, are disposed in an enclosure having an aperture in one of its walls, and are positioned in the path of a light beam entering the aperture, the intensity of which is to be determined. The detectors receive light from the beam incident upon the light sensitive surfaces thereof and produce electrical signals in dependence upon the intensity of the light incident thereon.

A problem associated with such optical detection systems is that in addition to the light from the optical system, the intensity of which is to be measured, ambient light also enters the aperture, so that the electrical signals produced by the detectors are stronger than would otherwise be the case. If the ambient light falling on each detector is at a constant intensity during any given measurement operation, or if all of the detectors in the array are exposed to the same ambient light intensity level, allowances can be made in the electrical signals produced by the detectors for the proportion of the signal which results from the ambient light falling on the detectors. However, this is not normally the case, so that a problem exists as to how to deal with the ambient light content in the signal from the detectors.

SUMMARY OF THE INVENTION

The invention as claimed in the appended claims reduces this problems in a simple and inexpensive manner by ensuring that all of the detectors have the same acceptance cone angle for light passing through the aperture. This can be accomplished by providing an arrangement wherein the optical path length between the aperture and each detector is the same. In this manner, the ratio of signal to ambient light in the portion of the light beam falling on each detector will be the same.

The effect of having all of the detectors viewing the same aperture from the same distance without interference is preferably achieved in accordance with the invention, by using beam splitters to deflect one or more portions of the beam entering the aperture from its path and towards one or more detectors which are offset from the axis.

Where the light beam entering the enclosure is a combined beam having two mutually orthogonally polarised components, a preferred feature of the invention is the provision in the path of the light beam near the aperture of a quarter-wave plate to convert the two orthogonally polarised components of the beam into interfering circularly polarised components.

BRIEF DESCRIPTION OF THE DRAWINGS

The invention will now be more particularly described by way of example only, with reference to the accompanying drawings in which.

DETAILED DESCRIPTION OF THE PREFERRED EMBODIMENT

Figure 1:
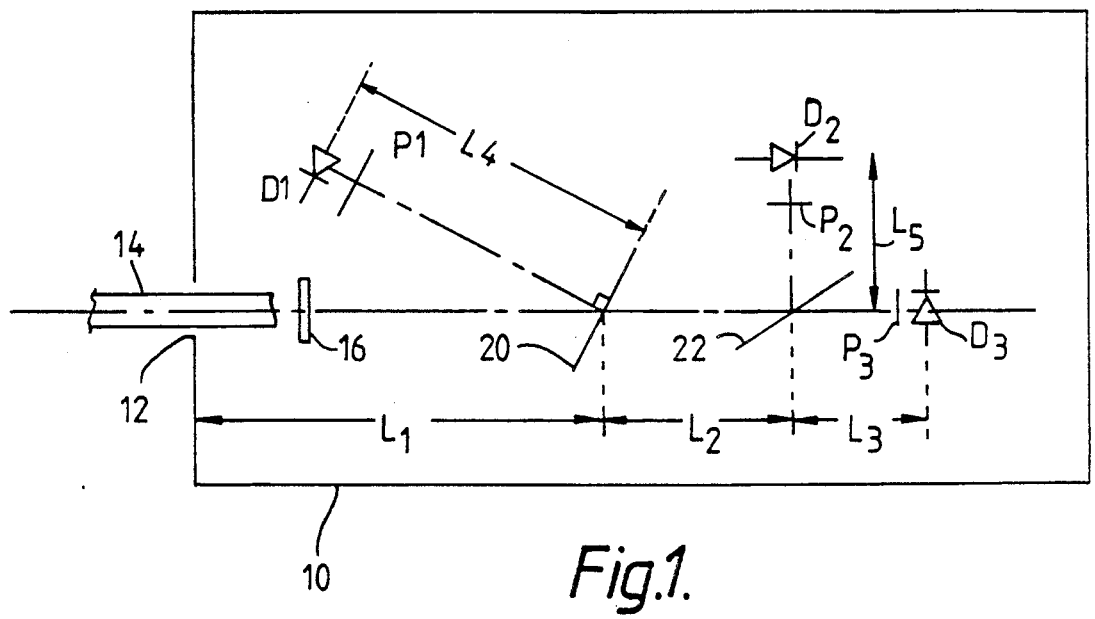
FIG. 1 is a simple diagrammatic representation of the arrangement of the optical components of the present invention inside an enclosure, and, FIG. 2 is a circuit diagram showing part of the electrical circuit for further processing the signals from the photo-diode detectors of FIG. 1.

Referring now to FIG. 1, three photo-diode detectors D1, D2 and D3 are positioned in an enclosure 10 having an aperture 12 through which a signal-carrying light beam 14 is directed. The light beam may be derived from any source e.g reflected illumination from a scale, or, as in the case of the present example, the light beam is a laser beam from a laser interferometer.

It is clear that in the absence of any additional shielding of the detector enclosure, the aperture 12 will also accept ambient light which will affect the intensity of the light at the detectors. In order to minimise the problems caused by the ambient light, two beam splitters 20 and 22 are positioned on the axis of the incoming laser beam. The first beam splitter is positioned at a distance L1 from the aperture 12, and the second beam splitter 22 is positioned at a distance L2 from the beam splitter 20. The beam splitter 20 reflects a first portion of the beam towards the detector D1 and transmits a second portion to the next beam splitter 22. Beam splitter 22 reflects a first portion of the remaining light in the beam to detector D2 and transmits a second portion to the detector D3. Detector D3 is disposed at a distance L3 from the second beam splitter 22.

In order to save space inside the enclosure 10, beam splitter 20 is set at a steep angle so that the beam reflected from its surface is directed transversely and forwardly through a distance L4 to detector D1. The beam splitter 22 is set at an angle of 45° so that the beam deflected from its surface is directed at right angles to the axis of the incident beam for a distance L5 to detector D2.

The optical path lengths between each detector and the aperture are made equal to ensure that each detector has the same acceptance cone angle for light entering the aperture. By acceptance cone angle is meant the solid angle subtended by the aperture at each detector. Thus the distances L1+L4, L1+L2+L5 and L1+L2+L3 are all equal.

Thus it can be seen that since each of the detectors will receive light from the whole of the aperture, the ratio of ambient light (noise) to signal level in the part of the beam striking each detector will be the same, regardless of the proportion of the total beam directed at each detector.

Considering now the optical details of the illustrated arrangement, the laser beam from the interferometer is a combined beam consisting of two orthogonally (s- and p-) polarised beams which, until entering the detector enclosure do not interfere. In order to be able to interrogate the beam to produce useful information from the detectors the two components must be made to interfere.

This is achieved by passing the combined beam through a quarter-wave plate 16 before it is received by the beam splitter 20. This produces from the two s- and p-polarised components of the combined beam two polarised beams having circular polarisations of opposite hand. These two beams interfere to produce a resultant beam having an orientation vector which is a measure of the difference in path length through the interferometer. The quarter-wave plate is preferably disposed close to the aperture but may be disposed inside or outside of the enclosure 10.

Polaroids P1,P2 and P3 having different polarisations are associated with each of the detectors D1,D2 and D3, so that the detector will receive maximum light intensity only when the orientation vector of the resultant beam is aligned with the polarisation state of the polaroid.

In the present example the polaroids have polarisation states oriented relative to each other in quadrature so that, for example, if P1 is polarised vertically, P2 will be polarised at 45° to the vertical, and P3 will be horizontally polarised. Thus the three detectors will produce phase-related a.c. signals which are in quadrature. The signals will however also include a d.c. level because of the ambient light reaching the detectors.

Although with the present detector arrangement the acceptance cone angles for the ambient light are the same, there still remains the problem that the beam splitters are not neutral. They therefore have the effect of transmitting and reflecting different amounts of light of different polarisations from the randomly polarised ambient light.

There are various alternative methods of dealing with this problem each of which have benefits and drawbacks, so that the choice of method is essentially a compromise. The main aim is to ensure that each detector receives the maximum light intensity and that the s- and p-polarised components of the light striking the 45° polaroid are equal thus avoiding intensity phase errors at the associated detector.

One solution would be to make beam splitter 20 a neutral beam splitter and to have polaroid P1 oriented at 45°, in combination with a polarising beam splitter at 22, thus eliminating the need for polaroids P2 and P3. Since a so-called neutral beam splitter which is commercially available reflects one third, transmits one third, and absorbs one third of the light impinging on it, detector D1 would then receive 33 percent of both of the vertically (s-) and horizontally (p-) polarised light. The neutral beam splitter would transmit 33% of the combined beam to the polarising beam splitter which would reflect say, the s-polarised component onto detector D2, and the p-polarised component onto detector D3. This arrangement avoids intensity phase errors at polaroid P1.

In a modification the neutral beam splitter could be used in conjunction with two polarising beam splitters thus eliminating the need for a 45° polaroid at all. In this case the reflected beam from beam splitter 22 would be directed to one of the polarising beam splitters which directs the s- and p-polarised components on to two separate detectors, while the transmitted beam from the beam splitter would be directed to the second polarising beam splitter which directs the s- and p- polarised components onto two further detectors.

The drawbacks to these solutions are that the neutral beam splitter and the polarising beam splitters are relatively expensive special components.

An alternative arrangement which eliminates the need for a polarising beam splitter would be to make beam splitters 20 and 22 neutral beam splitters and retain the three polaroids P1,P2 and p3 having their polarisation states oriented in quadrature. This however, results in only one ninth of the original beam intensity being available at detectors D2 and D3 which is likely to produce an unacceptably low signal level from the detector and, the arrangement still includes the relatively expensive neutral beam splitters.

The arrangement illustrated can be made to achieve relatively high percentages of the original beam intensity at the three detectors with low phase errors using relatively inexpensive commercially available beam splitters and polaroids.

The optical properties of both of the beam splitters illustrated are as follows:
Reflection co-efficient for p-polarised light RP=30%
Reflection co-efficient for s-polarised light RS=60%
Transmission co-efficient for p-polarised light TP=70%
Transmission co-efficient for s-polarised light TS=40%

The polaroids P1,P2 and P3 are arranged to have the following relative polarisation states:
P1 (0°) transmits s-polarised light only,
P2 (45°) transmits both s-and p-polarised light, and
P3 (90°) transmits p-polarised light only.

Hence it can be seen that detector D1, after a single reflection at beam splitter 20 receives 60% of the s-polarised component of the beam 14, the p-polarised component being blocked by polaroid P1. The polaroid P2 after one reflection and one transmission receives 24% of the s-polarised component and 21% of the p-polarised component of the beam 14, thus providing the detector D2 with approximately 22% of the original beam intensity. Detector D3 after two transmissions receives 49% of the p-polarised component of the beam 14, the s-polarised component being blocked by polaroid P3.

The benefits of this arrangement are:
(a) relatively cheap optical components
(b) a relatively high minimum intensity level at the detector D2 behind the 45° polaroid P2.

The main drawbacks of the arrangement are that there is a slight phase error introduced at the detector D2 behind the 45° polaroid P2 because the light striking that polaroid is not circularly polarised but slightly elliptically polarised, and that the intensities of the light incident on the three detectors D1,D2 and D3 are not equal (i.e. being 60%, 22% and 49% respectively). However, this inequality can be compensated for by amplifying the detector signals by correspondingly different amounts in the electrical circuit so that the electrical signals used for further processing are at the same levels. The phase error, once computed, can also be compensated for by further processing in the electrical circuit. Alternatively this phase error can be reduced by appropriately rotating the polaroid P2 a few degrees.

Figure 2:
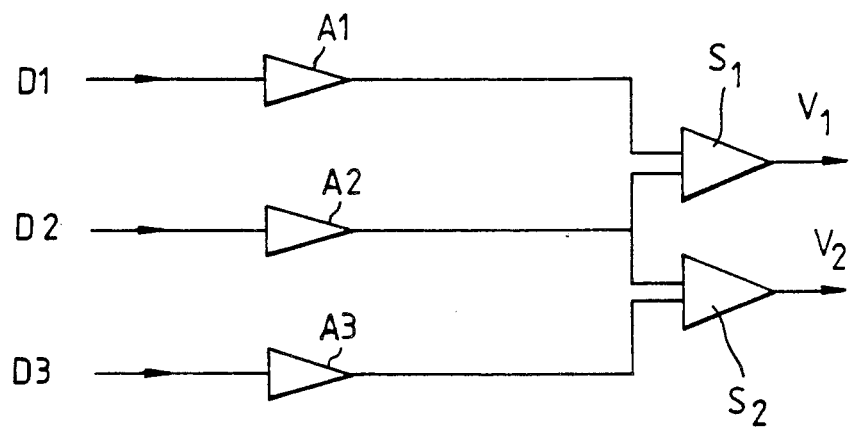

For completeness, part of a conventional electrical circuit for further processing the detector signals is illustrated in FIG. 2.

Referring to FIG. 2 the signals from detectors D1, D2 and D3 are passed to amplifiers A1,A2 and A3 which amplify the signals respectively in the ratios 1/0.60, 1/0.22, and 1/0.49.

Thus the signals produced all have the same amplitude in the a.c. component and, because of the above-described positioning of the detectors to equalise the optical path lengths from the aperture 12 to the detectors, they all have the same d.c. level due to the ambient light also. In order to obtain the two standard sine and cosine signals for further processing, the signal from amplifier A2 is subtracted from the signals from amplifiers A1 and A3 in known manner by differential amplifiers S1, and S2 to produce two a.c. signals V1 and V2 which have no d.c. component due to ambient light and which are in quadrature.

The words "optical" and "light" used throughout this specification and claims are to be understood to include light in the spectral range from infra-red to ultra-violet.

Because the beam splitters and polaroids are relatively thick there may be stray reflected beams off the front and back surfaces of these components which can modify the intensity of light reaching the detectors as thermal expansion changes the path length of the light beam through the glass.

This effect can be obviated by use of anti-reflective coating on the appropriate surfaces of the components, or can be minimised by making the components slightly wedge shaped.

I claim:

1. An optical detection system for providing information from a coherent light beam, comprising an ambient light limiting enclosure housing a plurality of photo-detectors and having an aperture in a wall thereof for receiving the coherent light beam, wherein the detectors are positioned at different places within the enclosure and an acceptance cone angle of light from said aperture is the same for each detector whereby a proportion of ambient light to coherent light reaching each detector is equalized.

2. An optical detection system according to claim 1 for providing information from a combined light beam which comprises two light beams polarised in two mutually orthogonal directions, and in which there is disposed in the path of the beam a quarter-wave plate positioned to produce from the two mutually orthogonally polarised beams in said combined beam two interfering circularly polarised beams of opposite hand.

3. An optical detection system according to claim 2 and in which at least one beam splitter is provided in the path of the light beam within the enclosure to receive the light beam from the quarter-wave plate and to deflect a portion of the light beam onto a different path and towards one of the detectors.

4. An optical detection system according to claim 3 and in which there are provided two beam splitters in the path of the light beam and three photo-diode detectors, a first one of the beam splitters receiving the light beam from the quarter-wave plate and deflecting a first portion of the light beam onto a different path and towards a first one of the detectors and transmitting a second portion of the light beam to the other beam splitter, which in turn deflects a third portion of the light beam onto a different path and towards a second one of the detectors and transmits a fourth portion of the light beam towards the third detector positioned in the beam path.

5. An optical detection system according to claim 4 and in which at least one of the two beam splitters has coefficients of reflection and transmission for the two orthogonally polarised components of the circularly polarised light in the combined beam which are greater than zero and less than one hundred percent, and a polariser is disposed in the path of one of the beam portions from said at least one beam splitter and is disposed between the beam splitter and one of the detectors, the polariser having a polarisation state such that only light polarised in one of said orthogonal directions reaches said detector.

6. An optical detection system according to claim 5 and in which both of the two beam splitters have coefficients of reflection and transmission for said two orthogonally polarised components which are greater than zero and less than one hundred percent, and a polariser having an appropriate polarisation state is disposed in the path of each of the beam portions between the beam splitters and the associated detectors whereby one of the detectors receives only s-polarised light, one of the detectors receives only p-polarised light and the third detector receives a mixture of s- and p-polarised light.

7. An optical detection system according to claim 6 and in which the reflection and transmission co-efficients of the beam splitters for light polarised respectively in said two orthogonal directions, and the position of the third detector, are chosen such that the intensities of the two orthogonally polarised components of the combined beam reaching said polariser are substantially equal.

8. An optical detection system according to claim 7 and in which the two beam splitters have reflection co-efficients for the two orthogonally polarised states Rp and Rs of 30% and 60% respectively, and transmission co-efficients for the two orthogonally polarised states Tp and Ts, of 70% and 40% respectively, and the polariser in front of the third detector is polarised at 45° to the two orthogonal directions.

* * * * *